(12) United States Patent
Jung et al.

(10) Patent No.: US 10,670,798 B2
(45) Date of Patent: Jun. 2, 2020

(54) LIQUID CRYSTAL DISPLAY DEVICE

(71) Applicant: LG DISPLAY CO., LTD., Seoul (KR)

(72) Inventors: Yeounjei Jung, Daegu (KR); Hakyeol Kwon, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/232,894

(22) Filed: Dec. 26, 2018

(65) Prior Publication Data

US 2019/0196093 A1   Jun. 27, 2019

(30) Foreign Application Priority Data

Dec. 27, 2017   (KR) .......................... 10-2017-0181130

(51) Int. Cl.
| | |
|---|---|
| *G02F 1/1333* | (2006.01) |
| *G02F 1/1335* | (2006.01) |
| *F21V 8/00* | (2006.01) |
| *G02F 1/1345* | (2006.01) |
| *G02F 1/1368* | (2006.01) |

(52) U.S. Cl.
CPC ........... *G02B 6/0086* (2013.01); *G02B 6/009* (2013.01); *G02B 6/0083* (2013.01); *G02F 1/13452* (2013.01); *G02B 6/0068* (2013.01); *G02F 1/1368* (2013.01); *G02F 1/133514* (2013.01); *G02F 2202/28* (2013.01)

(58) Field of Classification Search
CPC ............. G02F 1/1368; G02F 1/133345; G02F 1/133512; G02F 1/133514; G02F 1/13452; G02F 1/1333; G02F 1/133305; G02F 1/133308; G02F 1/1336; G02F 1/133615; G02F 1/1362; G02B 6/0068; G02B 6/0083; G02B 6/0086; G02B 6/009
See application file for complete search history.

(56) References Cited

U.S. PATENT DOCUMENTS

2009/0002598 A1*   1/2009   Choo ................... G02B 6/0091
349/62

* cited by examiner

*Primary Examiner* — Thoi V Duong
(74) *Attorney, Agent, or Firm* — Birch, Stewart, Kolasch & Birch, LLP

(57) ABSTRACT

A liquid crystal display device includes a liquid crystal panel, a backlight unit disposed on a rear surface of the liquid crystal panel to irradiate light, a guide panel to accommodate the liquid crystal panel and the backlight unit, a light blocking tape provided between the liquid crystal panel and the backlight unit to fix the liquid crystal panel and the backlight unit to the guide panel and a step compensating tape to compensate for a step which is a distance between the light blocking tape and the liquid crystal panel, and the step compensating tape has an adhesive force only on one surface thereof that is attached to the light blocking tape.

20 Claims, 6 Drawing Sheets

Related Art

Related Art

Related Art

LIQUID CRYSTAL DISPLAY DEVICE

CROSS-REFERENCE TO RELATED APPLICATION

This application claims priority under 35 U.S.C. § 119 to Korean Application No. 10-2017-0181130, filed in the Republic of Korea on Dec. 27, 2017, whose entire disclosure is herein incorporated by reference into the present application.

BACKGROUND

1. Field of the Invention

The present disclosure relates to a liquid crystal display device, and more particularly, to a liquid crystal display device including a step compensating tape configured to compensate for a step which is a distance between a light blocking tape and a liquid crystal panel.

2. Description of Related Art

A liquid crystal display device is a display device that displays an image by adjusting an amount of light transmitted through a liquid crystal. The liquid crystal display device has been widely used throughout the industry because the liquid crystal display device is thin and light and has low power consumption in comparison to other types of display devices.

Such a liquid crystal display device includes a liquid crystal panel configured to display an image and a backlight unit configured to provide light for visually expressing an image on a rear surface of the liquid crystal panel.

The liquid crystal display device is classified into an edge type and a direct type based on a shape of a light source, i.e., the backlight unit, being disposed.

In an edge type liquid crystal display device, the backlight unit includes a light source on a side surface thereof and a light guide plate provided on a rear surface of the liquid crystal panel to guide light emitted from the side surface to the front.

The edge type liquid crystal display device is advantageous in realizing slimness and downsizing in comparison to a direct type backlight unit, and thus is mainly used for a small-sized liquid crystal display device such as a cellular phone and the like.

The development of a direct type liquid crystal display device has begun in earnest when a large liquid crystal panel having a size of 20 inches or more is in use, and the direct type liquid crystal display device is configured such that a plurality of light sources are disposed on a lower surface of a diffusion plate to directly irradiate light to a front surface of the liquid crystal panel.

The direct type is mainly used for a large screen liquid crystal display device which requires high luminance because it has higher light utilization efficiency than the edge type.

The liquid crystal display device uses electro luminescence (EL), a cold cathode fluorescent lamp (CCFL), a hot cathode fluorescent lamp (HCFL) and a light emitting diode (LED) as a light source of the backlight unit.

Among them, the LED has advantages such as a long lifespan, a low power, a small size and high durability, and thus is used for various liquid crystal display devices.

In accordance with a user's demand for a light and thin liquid crystal display device as well as a low manufacturing cost, there has been proposed a chip on glass (COG) structure in which source driver ICs and gate driver ICs are bonded to a glass substrate with a liquid crystal panel formed thereon.

FIG. 1 is a sectional view of an edge type liquid crystal display device 1 having a COG structure according to the related art.

Referring to FIG.1, the liquid crystal display device 1 having a COG structure according to the related art includes a liquid crystal panel 10, a backlight unit 11 configured to provide light to the liquid crystal panel 10, a light blocking tape 12 provided between the liquid crystal panel 10 and the backlight unit 11 and configured to fix the liquid crystal panel 10 and the backlight unit 11 to a guide panel 13, and a step compensating tape 16 configured to compensate for a step which is a distance between the light blocking tape 12 and the liquid crystal panel 10. The liquid crystal panel 10 can include a thin film transistor substrate 103, at least one polarizing plate 101 configured to selectively transmit light having a wavelength in a specific direction, and a color filter substrate 102, the at least one polarizing plate 101 can bonded to the thin film transistor substrate 103 and to the color filter substrate 102.

The backlight unit 11 is disposed on a rear surface of the liquid crystal panel 10 and includes a plurality of LEDs 117, a printed circuit board 116 on which the plurality of light emitting diodes 117 are mounted, a light guide plate 112 disposed in parallel with the plurality of LEDs 117, a reflection plate 111 configured to reflect light irradiated to a rear surface of the light guide plate 112 in a direction of the liquid crystal panel 10, and an optical sheet 113 disposed on the light guide plate 112 and configured to diffuse or condense light.

A plurality of driving drivers 14 required to drive the liquid crystal display device 1 having the COG structure are mounted in a non-display area of the glass substrate with the liquid crystal panel formed thereon.

The liquid crystal display device having the COG structure is light and thin, but has a problem that it is difficult to reduce a bezel width due to an area where the driving drivers are mounted.

In accordance with the development of bonding technology and a user's demand for a thin bezel, there has been proposed a chip on film (COF) structure in which a source driver integrated circuit (IC) and a gate driver IC are bonded to a flexible circuit board connected to the liquid crystal panel.

FIG. 2 is a sectional view of an edge type liquid crystal display device 2 having a COF structure according to the related art.

Referring to FIG. 2, the liquid crystal display device 2 having a COF structure according to the related art includes a liquid crystal panel 20, a backlight unit 21 configured to provide light to the liquid crystal panel 20, a light blocking tape 22 provided between the liquid crystal panel 20 and the backlight unit 21 and configured to fix the liquid crystal panel 20 and the backlight unit 21 to a guide panel 23, and a step compensating tape 26 configured to compensate for a step which is a distance between the light blocking tape 22 and the liquid crystal panel 20. The liquid crystal panel 20 can include a thin film transistor substrate 203, at least one polarizing plate 201 configured to selectively transmit light having a wavelength in a specific direction, and a color filter substrate 202, the at least one polarizing plate 201 can bonded to the thin film transistor substrate 203 and to the color filter substrate 202.

The backlight unit 21 is disposed on a rear surface of the liquid crystal panel 20 and includes a plurality of light emitting diodes 217, a printed circuit board 216 on which the plurality of light emitting diodes 217 are mounted, a light guide plate 212 disposed in parallel with the plurality of light emitting diodes 217, a reflection plate 211 configured to reflect light irradiated to a rear surface of the light guide plate 212 in a direction of the liquid crystal panel 20, and an optical sheet 213 disposed on the light guide plate 212 and configured to diffuse or condense light.

A plurality of driving drivers required to drive the liquid crystal display device 2 having the COF structure are mounted on a flexible circuit board 25 connected to the liquid crystal panel 20.

The flexible circuit board 25, which is a circuit board with a complicated circuit formed on a flexible insulating film, can be made of a heat resistant plastic film such as polyester (PET) or polyimide (PI) which is a flexible material.

Since the driving driver is mounted on the flexible circuit board 25, the non-display area of the glass substrate where the driving driver is mounted is unnecessary. Thus, the liquid crystal display device having the COF structure can have a reduced bezel width in comparison to the liquid crystal display device having the COG structure.

As described above, the liquid crystal display device having the COF structure has an advantage that it is possible to use a thin bezel, but simultaneously has a problem such as deterioration in image quality resulting from an external force due to structural characteristics.

FIG. 3 is a sectional view of an edge type liquid crystal display device having a COF structure to which an external force is applied according to the related art.

FIG. 3 illustrates the liquid crystal panel 20 which is bent by an external force 3 applied to the liquid crystal display device 2 having the COF structure of FIG. 2.

The liquid crystal display devices according to the related art having the COG structure can secure a supporting force over a certain level with respect to the external force due to the non-display area where the driving driver is mounted. Thus, even when the step compensating tape having an adhesive force on both surfaces thereof is used, an orientation angle fluctuation degree of the LED resulting from the external force is weak.

But, the liquid display device having the COF structure is vulnerable to bending resulting from the external force due to the absence of the non-display area on which the driving driver is mounted. A light path changed by bending of the backlight unit 21 can cause a light leakage phenomenon or a hot spot phenomenon.

Specifically, a step compensating tape 26 of the liquid crystal display device 2 according to the related art has an adhesive force on both surfaces. One surface of the step compensating tape 26 is attached to the light blocking tape 22, and the other surface thereof is attached to the rear surface of the liquid crystal panel 20.

Therefore, as the liquid crystal panel 20 is bent by the external force 3, the step compensating tape 26 having the other surface attached to the rear surface of the liquid crystal panel 20 moves along the liquid crystal panel 20, and consequently the light blocking tape 22 attached to one surface of the step compensating tape 26 and the flexible circuit board 25 attached to the light blocking tape 22 also move along the liquid crystal panel 20.

That is, as the liquid crystal panel 20 is bent by the external force 3, a portion of the backlight unit 21 attached to the liquid crystal panel 20 is bent together with the liquid crystal panel 20.

At this time, orientation angles of the plurality of LEDs 217 mounted on the flexible circuit board 216 vary by a certain angle or more as the backlight unit 21, particularly the flexible circuit board 216, is bent.

When comparing a light path 32 of light emitted from the LED 217 to a light path 31 of light emitted from the LED 217 before an external force is applied to the liquid crystal panel 20, an incident angle of the light path 32 of the light emitted from the LED 217 after the external force is applied to the liquid crystal panel 20 can be increased.

Thus, the light path changed by bending of the backlight unit 21 can cause a light leakage phenomenon or a hot spot phenomenon, which can lead to deterioration in image quality of the liquid crystal display device.

SUMMARY OF THE INVENTION

An aspect of the present disclosure provides a liquid crystal display device which can constantly maintain an orientation angle of a light emitting diode (LED) regardless of a movement or bending of a liquid crystal panel resulting from an impact applied from the outside, thereby preventing deterioration in image quality such as a light leakage phenomenon and a hot spot phenomenon.

Another aspect of the present disclosure provides a liquid crystal display device which can support a liquid crystal panel through a step compensating tape, thereby preventing a breakage of the liquid crystal panel resulting from an impact applied from the outside.

Aspects of the present disclosure are not limited to the above-described aspects, and the other aspects and advantages of the present disclosure will become apparent from the followin 2018-12-26g description of embodiments. In addition, it is easily understood that the aspects and advantages of the present disclosure can be achieved by the means described in the claims and a combination thereof.

According to an aspect of the present disclosure, there is provided a liquid crystal display device. The liquid crystal display device can include a liquid crystal panel, a backlight unit disposed on a rear surface of the liquid crystal panel and configured to irradiate light, a guide panel configured to accommodate the liquid crystal panel and the backlight unit, a light blocking tape provided between the liquid crystal panel and the backlight unit and configured to fix the liquid crystal panel and the backlight unit to the guide panel, and a step compensating tape configured to compensate for a step which is a distance between the light blocking tape and the liquid crystal panel, and the step compensating tape has an adhesive force only on one surface thereof to be attached to the light blocking tape.

According to an embodiment of the present disclosure, the backlight unit can include a plurality of LEDs configured to provide light to the liquid crystal panel, a printed circuit board on which the plurality of LEDs are mounted, and a light guide plate disposed in parallel with the plurality of LEDs, and the light blocking tape can have one surface attached to the step compensating tape, and the other surface attached to the guide panel, the printed circuit board, and the light guide plate.

According to an embodiment of the present disclosure, the step compensating tape can have one end in a direction of the light guide plate that overlaps one end of a color filter substrate included in the liquid crystal panel by a predetermined first width.

According to an embodiment of the present disclosure, the step compensating tape can have one end in a direction of the light guide plate that overlaps one end of a pad portion of a thin film transistor substrate included in the liquid crystal panel by a predetermined second width.

According to an embodiment of the present disclosure, the step compensating tape can have one end in a direction of the light guide plate that overlaps one end of a printed circuit board included in the backlight unit by a predetermined third width.

According to an embodiment of the present disclosure, the step compensating tape can have one end in a direction of the light guide plate that overlaps one end of a polarizing plate included in the liquid crystal panel by a predetermined fourth width.

According to an embodiment of the present disclosure, an upper surface of the step compensating tape can be in contact with a rear surface of the liquid crystal panel when the liquid crystal panel is fixed, and can be separated from the rear surface of the liquid crystal panel when the liquid crystal panel is moved.

According to an embodiment of the present disclosure, the liquid crystal panel can be connected to a panel driving substrate on which a driving driver is mounted through a connection member.

According to an embodiment of the present disclosure, the step compensating tape can have the other end in a direction of the light guide plate that overlaps one end of the panel driving substrate by a predetermined fifth width.

The liquid crystal display device according to an aspect of the present disclosure can constantly maintain an orientation angle of the LED regardless of a movement or bending of the liquid crystal panel resulting from an external force, thereby preventing deterioration in image quality such as a light leakage phenomenon and a hot spot phenomenon.

The liquid crystal display device according to another aspect of the present disclosure can support the liquid crystal panel through the step compensating tape, thereby preventing a breakage of the liquid crystal panel resulting from an external force.

DETAILED DESCRIPTION OF THE EMBODIMENTS

Figure 1:
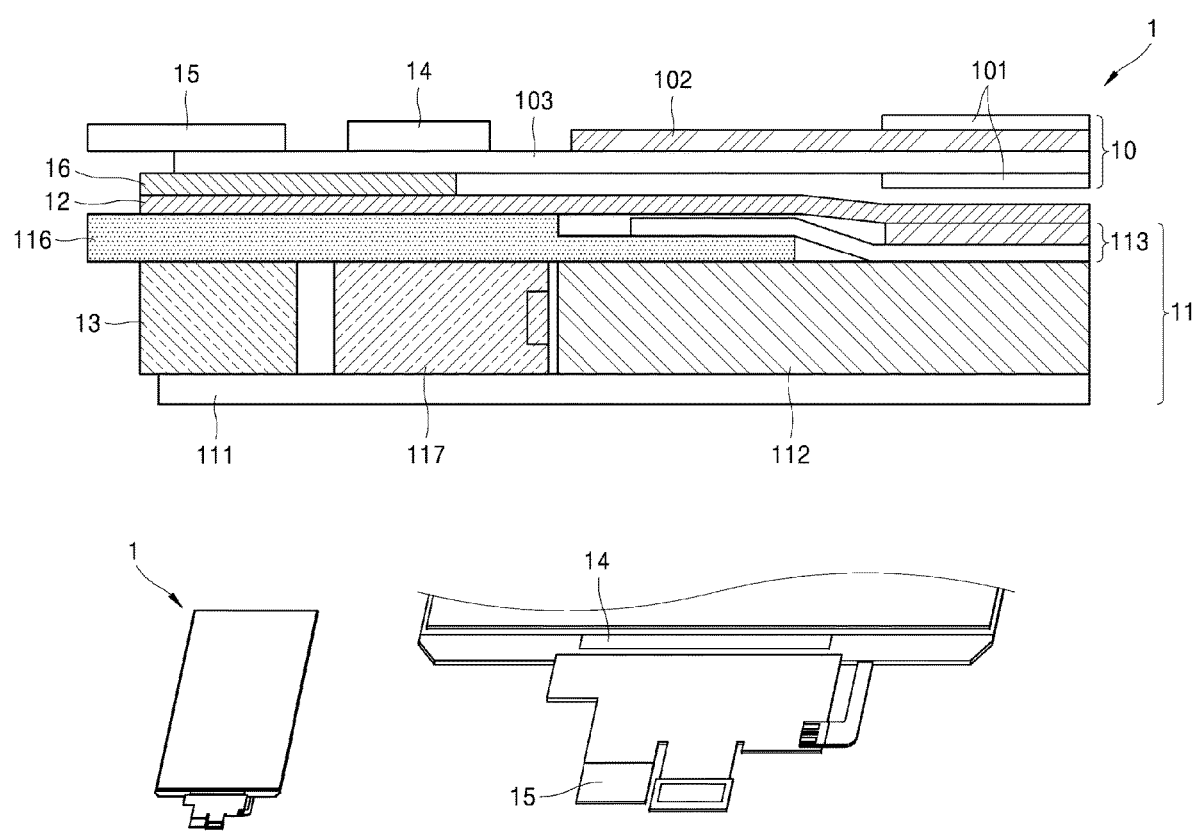
FIG. 1 is a sectional view of an edge type liquid crystal display device having a COG structure according to the related art.

The above-described aspects, features and advantages will be described in detail with reference to the accompanying drawings, so that those skilled in the art can easily carry out a technical idea of the present disclosure. In the description of the embodiments, the detailed description of well-known related configurations or functions will be omitted when it is deemed that such description will cause ambiguous interpretation of the present disclosure. Hereinafter, preferred embodiments of the present disclosure will be described in detail with reference to the accompanying drawings. In the drawings, same reference numerals designate same or like elements.

Figure 4:
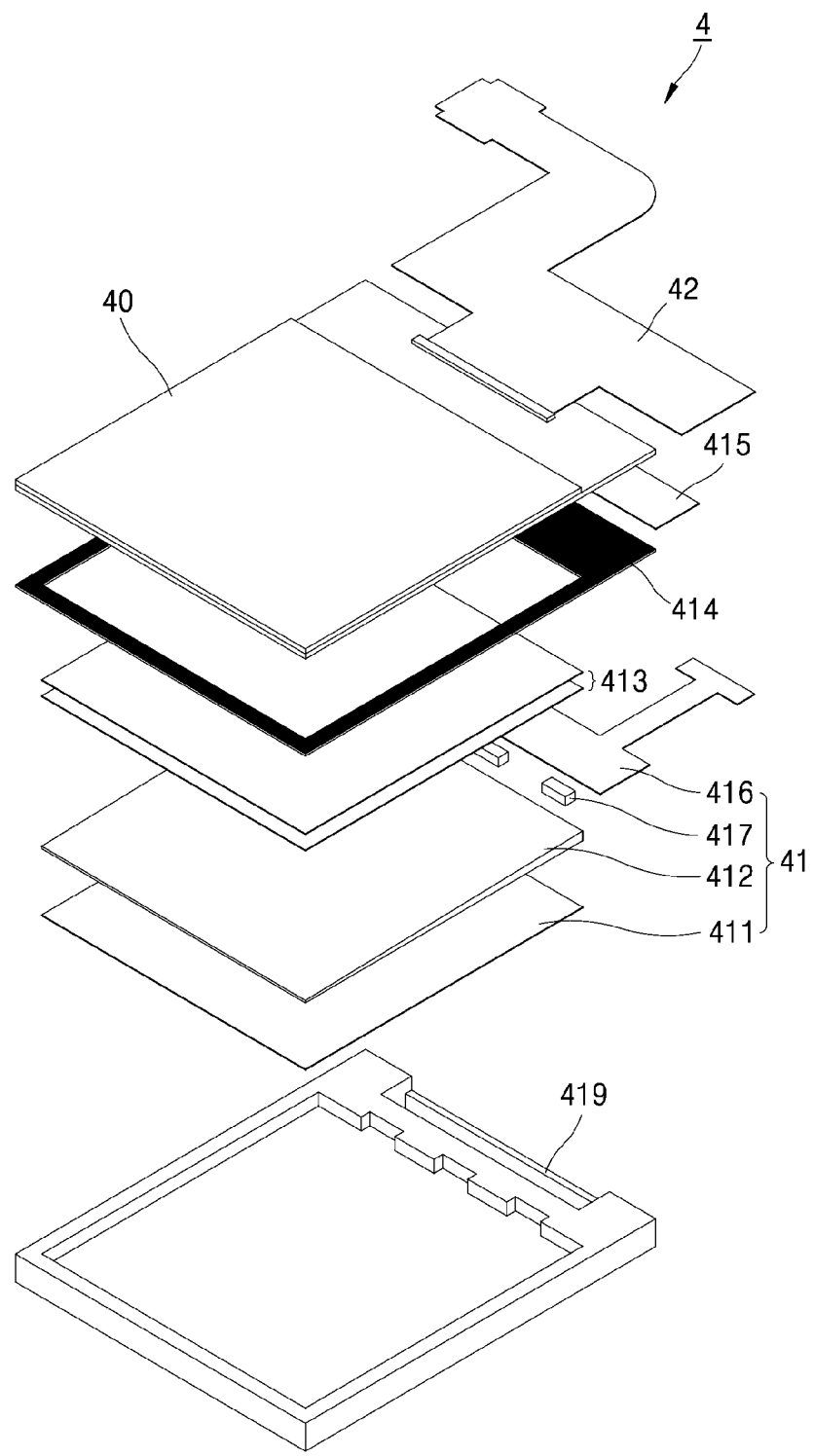
FIG. 4 is an exploded perspective view illustrating a liquid crystal display device according to an embodiment of the present disclosure.
Figure 5:
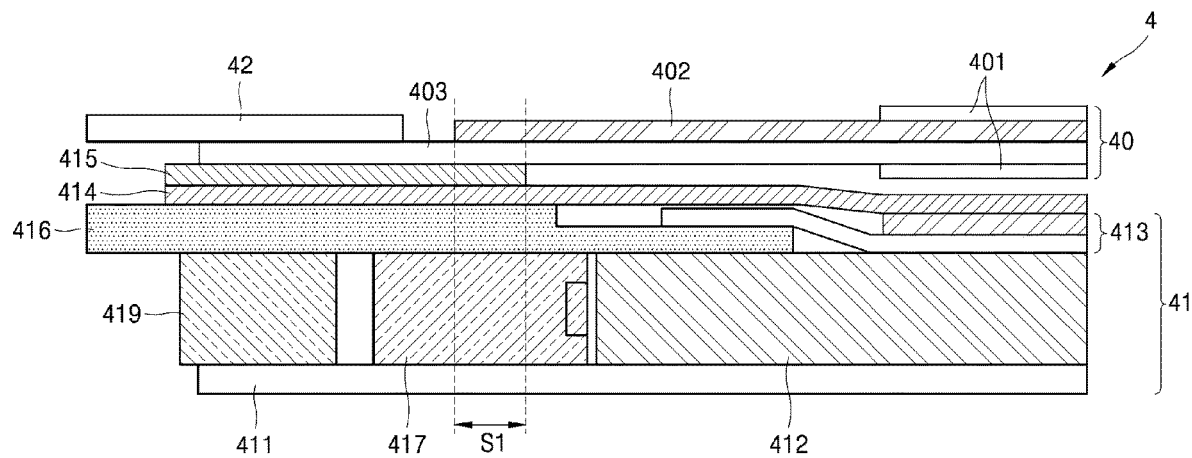
FIG. 5 is a sectional view of the liquid crystal display device according to an embodiment of the present disclosure illustrated in FIG. 4.

FIG. 4 is an exploded perspective view illustrating a liquid crystal display device according to an embodiment of the present disclosure, and FIG. 5 is a sectional view of the liquid crystal display device according to an embodiment of the present disclosure illustrated in FIG. 4. All the components of the liquid crystal display device according to all embodiments of the present disclosure are operatively coupled and configured.

Referring to FIGS. 4 and 5, a liquid crystal display device 4 according to an embodiment of the present disclosure can include a liquid crystal panel 40 configured to display an image, a backlight unit 41 disposed on a rear surface of the liquid crystal panel 40 and configured to irradiate light, a guide panel 419 configured to accommodate the liquid crystal panel 40 and the backlight unit 41, a light blocking tape 414 provided between the liquid crystal panel 40 and the backlight unit 41 and configured to fix the liquid crystal panel 40 and the backlight unit 41 to the guide panel 419, and a step compensating tape 415 configured to compensate for a step, which is a distance between the light blocking tape 414 and the liquid crystal panel 40.

The liquid crystal panel 40 can include a thin film transistor substrate 403, a color filter substrate 402 attached to the thin film transistor substrate 403, and a liquid crystal formed between the thin film transistor substrate 403 and the color filter substrate 402.

A polarizing plate 401 configured to selectively transmit light having a wavelength in a specific direction can be bonded to outer surfaces of the thin film transistor substrate 403 and the color filter substrate 402.

The liquid crystal panel 40 can be connected to a panel driving substrate 42 on which a driving driver is mounted through a connection member.

The panel driving substrate 42, which is a circuit board with a complicated circuit formed on a flexible insulating film, can be a flexible circuit board made of a heat resistant plastic film such as polyester (PET) or polyimide (PI) which is a flexible material.

The thin film transistor substrate 403 can have pixels defined by crossing a plurality of gate lines and data lines each other, and a thin film transistor can be provided for each of crossing areas and connected to a pixel electrode mounted on each of the pixels in a corresponding manner.

The color filter substrate 402 can include a color filter having colors of red (R), green (G) and blue (B) corresponding to each pixel and a black matrix configured to surround edges of the color filter having colors of R, G and B corresponding to each pixel and cover the gate line, data line, and thin film transistor.

The backlight unit 41 disposed on the rear surface of the liquid crystal panel 40 can include a plurality of LEDs 417 configured to provide light to the liquid crystal panel 40, a printed circuit board 416 on which the plurality of LEDs 417 are mounted, and a light guide plate 412 disposed in parallel with the plurality of LEDs 417.

Also, the backlight unit 41 can further include a reflection plate 411 disposed on a rear surface of the light guide plate 412 and configured to reflect light emitted to the rear surface of the light guide plate 412 in a direction of the liquid crystal panel 40, and an optical sheet 413 disposed on the light guide plate 412 and configured to diffuse or condense light.

The printed circuit board 42, which is a circuit board with a complicated circuit formed on a flexible insulating film, can be a flexible circuit board made of a heat resistant plastic film such as polyester (PET) or polyimide (PI) which is a flexible material.

The light blocking tape 414 can be provided between the liquid crystal panel 40 and the backlight unit 41 to fix the backlight unit 41 and the liquid crystal panel 40 to the guide panel 419, and can be entirely made in black to prevent light emitted from the backlight unit 41 from leaking to the outside.

Specifically, the light blocking tape 414 can have one surface attached to the step compensating tape 415, and the other surface attached to the guide panel 419, the printed circuit board 416 and the light guide plate 412.

The step compensating tape 415 can compensate for a step which is a distance between the light blocking tape 414 and the liquid crystal panel 40.

More specifically, in FIG. 5, a rear surface of the polarizing plate 401 attached to the thin film transistor substrate 403 of the liquid crystal panel 40 can be in contact with an upper surface of the light blocking tape 414.

At this time, there is a step between the thin film transistor substrate 403 and the light blocking tape 414 in an area where the polarizing plate 401 does not exist in the liquid crystal panel 40, and the step compensating tape 415 can be attached to the upper surface of the light blocking tape 414 so as to compensate for the step between the liquid crystal panel 40 and the light blocking tape 414, particularly between the thin-film transistor substrate 403 and the light blocking tape 414.

The thickness of the light blocking tape 414 can vary depending on a distance of the step between the light blocking tape 414 and the liquid crystal panel 40.

The step compensating tape 415 can have one end in a direction of the light guide plate 412 that overlaps one end of the color filter substrate 402 included in the liquid crystal panel 40 by a predetermined first width.

Also, the step compensating tape 415 can have one end in a direction of the light guide plate 412 that overlaps one end of a pad portion of the thin film transistor substrate 403 included in the liquid crystal panel 40 by a predetermined second width, and can have one end in a direction of the light guide plate 412 that overlaps one end of a pad portion of the printed circuit substrate 416 included in the backlight unit 41 by a predetermined third width.

The step compensating tape 415 can have one end in a direction of the light guide plate 412 that is spaced from one end of the polarizing plate 401 by predetermined fourth width.

At this time, the step compensating tape 415 can have the other end in a direction of the light guide plate 412 that overlaps one end of the panel driving substrate 42 by a predetermined fifth width.

Unlike the liquid crystal display device having the COG structure according to the related art, the liquid crystal display device having the COF structure according to embodiments of the present disclosure is configured such that the driving driver is not mounted on the glass substrate on which the liquid crystal panel is formed, and thus the width of the non-display area of the glass substrate can be reduced.

But, due to a structure of the glass substrate on which the driving driver is not mounted and a reduced width of the non-display area of the glass substrate, the liquid crystal display device having the COF structure is vulnerable to deformation of the thin film transistor resulting from an external force.

In the liquid crystal display device having the COF structure according to embodiments of the present disclosure, the step compensating tape configured to compensate for a step which is a distance between the light blocking tape and the liquid crystal panel can have one end that overlaps one end of each of the color filter substrate, the thin film transistor substrate and the printed circuit board, and the other end that overlaps one end of the panel driving substrate attached to the liquid crystal panel, thereby improving a supporting force. As a result, it is possible to prevent a breakage of the thin film transistor resulting from an impact applied from the outside.

Referring to FIGS. 4 and 5, the light blocking tape 414 can have one surface attached to the step compensation tape 415, a first area of the other surface attached to the printed circuit board 416, and a second area of the other surface attached to the optical sheet 413 which is disposed on the light guide plate 412 and configured to diffuse or condense light.

The step compensating tape 415 can have one end in a direction of the light guide plate that overlaps one end of the color filter substrate 402 included in the liquid crystal panel 40 by a predetermined first width S1.

Figure 2:
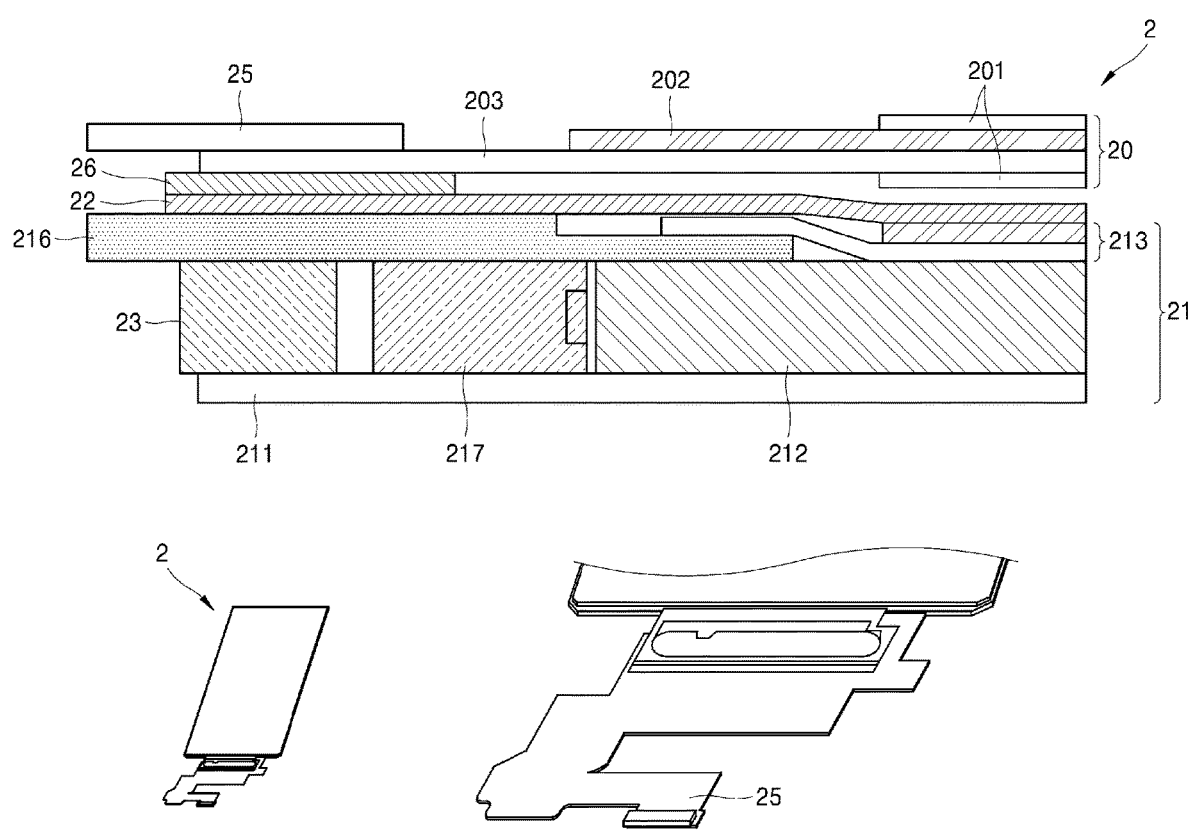
FIG. 2 is a sectional view of an edge type liquid crystal display device having a COF structure according to the related art.

When comparing FIGS. 2 and 5, the liquid crystal display device 4 according to an embodiment of the present disclosure can include the step compensating tape 415 whose one end overlaps one end of the color filter substrate 402 by the predetermined first width S1, unlike the liquid crystal display device 2 having the COF structure according to the related art.

In this way, the step compensating tape 415 and the color filter substrate 402 can partially overlap each other. Accordingly, when an impact is applied to the liquid crystal display device 4, particularly the liquid crystal panel 40 is bent due to an external force, a magnitude of the external force applied to the thin film transistor substrate 403 can be reduced by the color filter substrate 402 and the step compensating tape 415 which support the thin film transistor substrate 403 at upper and lower portions of the thin film transistor substrate 403.

At this time, an overlapping width of the step compensating tape 415 and the color filter substrate 402, that is, the predetermined first width S1 can become wider as the predetermined fourth width which is a distance between one end of the polarizing plate 401 included in the liquid crystal panel 40 and that of the step compensating tape 415 becomes narrower. As the first width Si becomes wider, a magnitude of the external force applied to the thin film transistor substrate 403 can be reduced.

As a result, an overlapping structure of the step compensating tape 415 and the color filter substrate 402 can prevent a breakage of the thin film transistor substrate 403 resulting from an impact applied from outside.

The step compensating tape 415 can have an adhesive force only on one surface thereof to be attached to the light blocking tape 414. For example, the step compensating tape 415 has both an adhesive surface having adhesive properties and a non-adhesive surface having no adhesive properties, where these surface can be opposite to each other. The adhesive surface of the step compensating tape 415 is adhered to at least one surface of the light blocking tape 414, whereas the step compensating tape 415 is not adhered to any layer/element nearby at the non-adhesive surface.

The step compensating tape 415 can have an adhesive force only on one surface thereof to be attached the light blocking tape 414, that is, a rear surface thereof, and can have no adhesive force on an upper surface thereof in contact with the liquid crystal panel 40.

That is, when the liquid crystal panel 40 is fixed in its original position in the liquid crystal display device 4 in a state where an external force is applied, the upper surface of the step compensating tape 415 can be in contact with the rear surface of the liquid crystal panel 40 and support the liquid crystal panel 40.

As described above, the liquid crystal display device according to embodiments of the present disclosure can support the liquid display panel through the step compensating tape, thereby preventing a breakage of the liquid display panel resulting from an impact applied from outside.

When the liquid crystal panel 40 is fixed, the upper surface of the step compensating tape 415 can be in contact with the rear surface of the liquid crystal panel 40. When the liquid crystal panel 40 is moved, the upper surface of the step compensating tape 415 can be separated from the rear surface of the liquid crystal panel 40.

When the liquid crystal panel 40 is moved or bent from its original position in the liquid crystal display device in a specific direction due to an external force, the upper surface of the step compensating tape 415 which has no adhesive force can be easily separated from the rear surface of the liquid crystal panel 40.

The backlight unit 41 with the step compensating tape 415 attached thereto through the light blocking tape 414 can always maintain its original position regardless of bending of the liquid crystal panel 40. Further, the plurality of LEDs 417 included in the backlight unit 41 can also maintain their original orientation angles.

Figure 6:
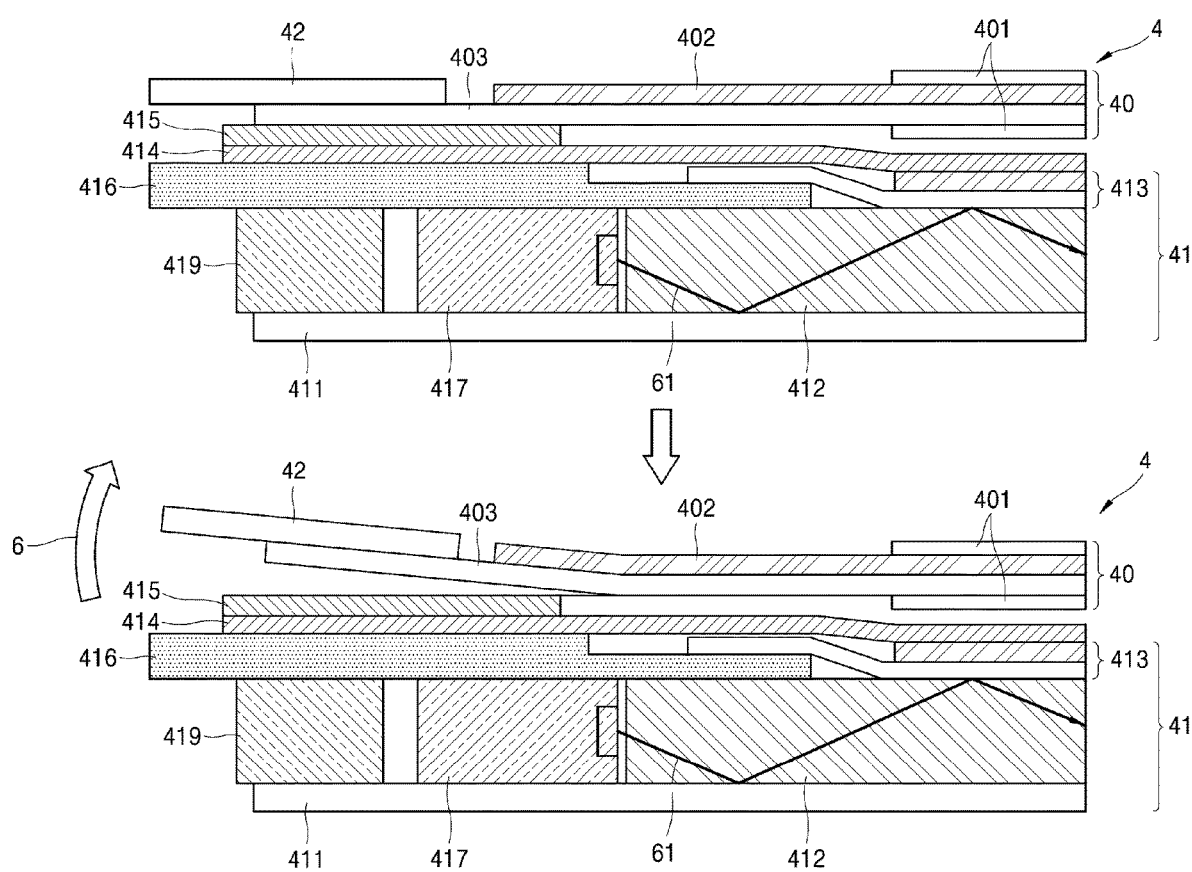
FIG. 6 is a sectional view of a liquid crystal display device according to an embodiment of the present disclosure to which an external force is applied.

FIG. 6 is a sectional view of a liquid crystal display device according to an embodiment of the present disclosure to which an external force is applied.

FIG. 6 illustrates the liquid crystal panel 40 which is bent due to an external force 6 applied to the liquid crystal display device 4 of the FIG. 5.

As described above, the step compensating tape 415 can have an adhesive force only on one surface thereof to be attached to the light blocking tape 414, e.g., the rear surface thereof, and can have no adhesive force on the upper surface thereof in contact with the liquid crystal panel 40.

That is, when the liquid crystal panel 40 is fixed in its original position in the liquid crystal display device in a state where an external force is applied, the upper surface of the step compensating tape 415 can be in contact with the rear surface of the liquid crystal panel 40 and support the liquid crystal panel 40.

When the liquid crystal panel 40 is bent in a direction opposite to the step compensating tape 415 by the external force 6, the upper surface of the step compensating tape 415 which has no adhesive force can be separated from the rear surface of the liquid crystal panel 40, that is, the rear surface of the thin film transistor substrate 403.

At this time, a portion of the backlight unit 41 including the printed circuit board 416 on which the plurality of LEDs 417 are mounted can be separated from the liquid crystal panel 20, and maintain its original position without being bent along with the liquid crystal panel 40.

Figure 3:
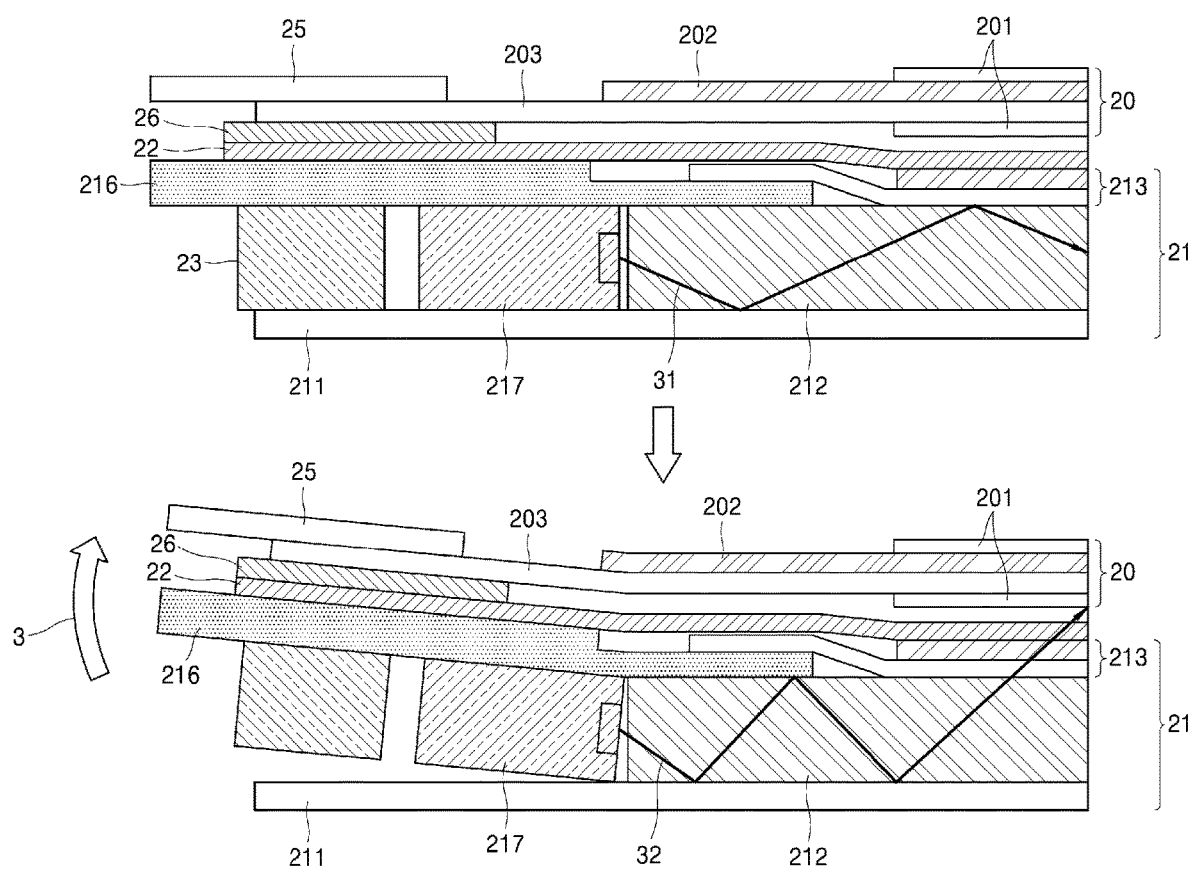
FIG. 3 is a sectional view of an edge type liquid crystal display device having a COF structure to which an external force is applied according to the related art.

When comparing the liquid crystal display device 4 to the liquid crystal display device 2 of the related art using the step compensating tape 26 which has an adhesive force on both surfaces thereof illustrated in FIG. 3, the LEDs 417 of the liquid crystal display device 4 of the present invention can maintain their original orientation angles by using the step compensating tape 415 which has no adhesive force on the upper surface thereof even when the liquid crystal panel 40 is bent in a direction opposite to the step compensating tape 415 due to an external force. As a result, the light path 61 of light emitted from the plurality of LEDs 417 before and after the external force is applied to the liquid crystal panel 40 can be the same.

For example, the liquid crystal display device according to embodiments of the present disclosure can constantly maintain an orientation angle of the LED regardless of a movement or bending of the liquid crystal panel resulting from an impact applied from the outside, thereby preventing deterioration in image quality such as a light leakage phenomenon and a hot spot phenomenon.

The present disclosure described as above is not limited by the embodiments described herein and accompanying drawings. It should be apparent to those skilled in the art that various substitutions, changes and modifications which are not exemplified herein but are still within the spirit and scope of the present disclosure can be made.

What is claimed is:

1. A liquid crystal display device, comprising:
   a liquid crystal panel;
   a backlight unit disposed on a rear surface of the liquid crystal panel and configured to irradiate light;
   a guide panel configured to accommodate the liquid crystal panel and the backlight unit;
   a light blocking tape provided between the liquid crystal panel and the backlight unit and configured to fix the liquid crystal panel and the backlight unit to the guide panel; and
   a step compensating tape configured to compensate for a step which is a distance between the light blocking tape and the liquid crystal panel,
   wherein the step compensating tape has an adhesive force only on one surface thereof that is attached to the light blocking tape.

2. The liquid crystal display device of claim 1, wherein the backlight unit comprises:
   a plurality of light emitting diodes (LEDs) configured to provide light to the liquid crystal panel;
   a printed circuit board on which the plurality of LEDs are mounted; and
   a light guide plate disposed in parallel with the plurality of LEDs,
   wherein the light blocking tape has a first surface attached to the step compensating tape, and a second surface attached to the guide panel, the printed circuit board and the light guide plate.

3. The liquid crystal display device of claim 1, wherein the step compensating tape has one end in a direction of the light guide plate that overlaps one end of a color filter substrate included in the liquid crystal panel by a predetermined width.

4. The liquid crystal display device of claim 3, wherein the step compensating tape has one end in a direction of the light guide plate that is spaced from one end of a polarizing plate included in the liquid crystal panel by a predetermined width.

5. The liquid crystal display device of claim 4, wherein the liquid crystal panel is connected to a panel driving substrate on which a driving driver is mounted through a connection member.

6. The liquid crystal display device of claim 1, wherein the step compensating tape has one end in a direction of the light guide plate that overlaps one end of a pad portion of a thin film transistor substrate included in the liquid crystal panel by a predetermined width.

7. The liquid crystal display device of claim 1, wherein the step compensating tape has one end in a direction of the light guide plate that overlaps one end of a printed circuit board included in the backlight unit by a predetermined width.

8. The liquid crystal display device of claim 1, wherein an upper surface of the step compensating tape is in contact with a rear surface of the liquid crystal panel when the liquid crystal panel is fixed, and is separated from the rear surface of the liquid crystal panel when a predetermined external force is applied to the liquid crystal panel.

9. The liquid crystal display device of claim 8, wherein the step compensating tape has another end in a direction of the light guide plate that overlaps one end of the panel driving substrate by a predetermined fifth width.

10. A liquid crystal display device, comprising:
   a liquid crystal panel configured to display images;
   a light blocking tape disposed below the liquid crystal panel; and
   a step compensating tape provided between the liquid crystal panel and the light blocking tape to compensate for a step, which correspond to a distance between the liquid crystal panel and the light blocking tape,
   wherein the step compensating tape includes an adhesive surface and a non-adhesive surface opposite to the adhesive surface, and the adhesive surface of the step compensating tape is adhered to a first side of the light blocking tape.

11. The liquid crystal displaying device of claim 10, wherein upon application of a predetermined external force, the liquid crystal panel is configured to be bent away from the step compensating tape.

12. The liquid crystal displaying device of claim 11, wherein during the application of the predetermined external force, the light blocking tape and the step compensating tape remain fixed to each other.

13. The liquid crystal displaying device of claim 11, further comprising:
   at least one light source configured to provide light to the liquid crystal panel; and
   a reflection plate disposed below the at least one light source,
   wherein during the application of the predetermined external force, the at least one light source is not separated from the reflection plate.

14. The liquid crystal displaying device of claim 13, wherein the at least one light source includes a plurality of light emitting diodes (LEDs).

15. The liquid crystal displaying device of claim 10, further comprising a backlight unit adhesively attached to a second side of the light blocking tape, the second side of the light blocking tape being opposite to the first side of the light blocking tape.

16. The liquid crystal displaying device of claim 10, wherein the liquid crystal panel includes a color filter substrate, and the color filter substrate overlaps the step compensating tape.

17. The liquid crystal displaying device of claim 16, wherein the liquid crystal panel panel further includes a panel driving substrate, and the panel driving substrate overlaps the step compensating tape to prevent damage due to the predetermined external force.

18. A method of providing a liquid crystal display device, the method comprising:
   providing a liquid crystal panel configured to display images;
   disposing a light blocking tape below the liquid crystal panel; and
   providing a step compensating tape between the liquid crystal panel and the light blocking tape to compensate for a step, which correspond to a distance between the liquid crystal panel and the light blocking tape,
   wherein the step compensating tape includes an adhesive surface and a non-adhesive surface opposite to the adhesive surface, and the adhesive surface of the step compensating tape is adhered to a first side of the light blocking tape.

19. The method of claim 18, wherein the providing the liquid crystal panel includes:
   disposing a color filter substrate of the liquid crystal panel to overlap the step compensating tape.

20. The method of claim 18, wherein upon application of a predetermined external force, the liquid crystal panel is configured to be bent away from the step compensating tape while the light blocking tape and the step compensating tape remain fixed to each other.

* * * * *